Figure 1:
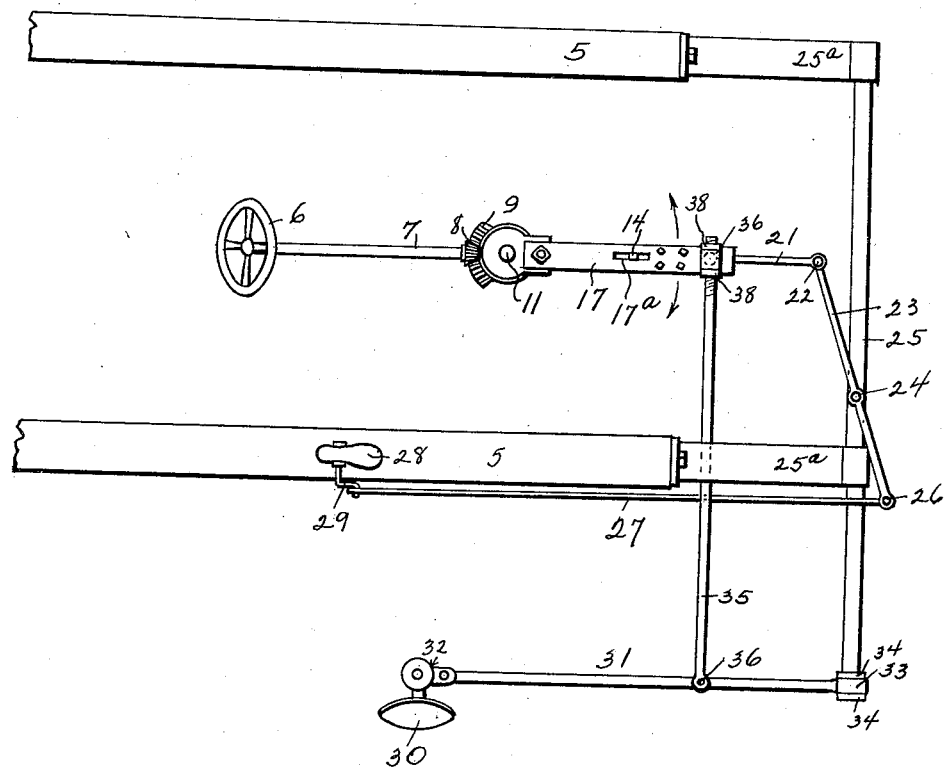

Feb. 2, 1932.                H. KOENIG                1,843,327
                            TRACTOR GUIDE
                         Filed May 25, 1931

INVENTOR
Henry Koenig.
BY Samuel Herrick,
ATTORNEY

Patented Feb. 2, 1932

1,843,327

UNITED STATES PATENT OFFICE

HENRY KOENIG, OF FAIRFAX, SOUTH DAKOTA

TRACTOR GUIDE

Application filed May 25, 1931. Serial No. 539,921.

This invention relates to guides for tractors and it has for its object to provide, in combination with the tractor, a guiding element which travels in the furrow and is connected to the steering mechanism of the tractor in such manner that the tractor is caused to follow the direction of the furrow.

As this description proceeds it will be seen that this general object is accomplished in a more facile, economical and efficient way than in any known device of this character.

In the drawings—

Figure 2:
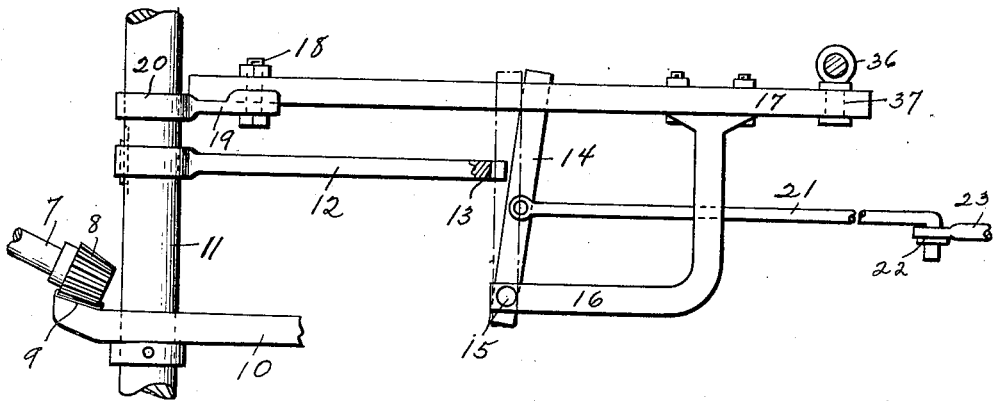

Fig. 1 is a plan view of the steering connections of the present invention, showing same associated with a portion of a tractor frame, and Fig. 2 is a side view of some of said connections.

Like numerals designate corresponding parts in both the figures of the drawings.

Referring to the drawings, 5 designates in a general way a plan view of a portion of the frame of a conventional type of farm tractor, the front wheels being omitted. In tractors of this type the steering is effected by the manipulation of a hand wheel 6, which through shaft 7, turns a pinion 8 which meshes with a segmental gear 9 upon segment 10.

The segment 10 is fast upon a vertical shaft 11 which constitutes a part of the conventional steering mechanism of the tractor and the turning of which shaft effects the steering of the tractor.

In carrying out the invention I key upon the shaft 11, a sector 12 having a notch 13 formed in its outer end. This notch is adapted to be engaged by a latch bar or pin 14 that is pivoted at 15 to a bracket 16. The bracket 16 depends from the under side of a plate 17. The plate 17 in turn is secured by bolt 18 to extension 19 of a collar 20, the latter being mounted upon but loose with respect to shaft 11. The plate 17 is provided with a slot 17a through which the latch 14 may move and this latch may be withdrawn from the notch 13 by the action of a link 21. This link is pivoted at 22 to a lever 23, said lever being pivoted in turn, at 24 to a crossbar 25. The outer end of the lever is pivoted at 26 to a rod 27. The rod 27 is operable by a foot pedal 28 through the medium of a crank arm 29.

A trailing disk 30 is carried at the rear end of a trailing arm 31 and is connected to said arm through the medium of a universal joint 32, which permits adjustment of the disk in both vertical and horizontal planes.

The forward end of the trailing arm is provided with a collar 33, which is mounted to turn upon crossbar 25 and is held in place by collars 34 and tie rod 35 is pivoted to trailing arm 31 at 36. The disk 30 is intended to travel in the furrow and its lateral movement is transmitted through tie rod 35 to plate 17 through an eyelet 36, the shank 37 of which passes through plate 17. The end of the tie rod passes through the eyelet 36 and carries nuts 38 upon the opposite sides of said eyelet so that the throw of the parts may be adjusted. The crossbar 25 is supported in brackets 25a, which are bolted to front ends of the side frame members 5, of the tractor.

In most of the devices of this nature, with which I am familiar, it is necessary to lift the guide disk entirely out of the furrow when turning around at the end of a row, or whenever it is desired to disengage the device so that it will not control the steering of the tractor. By virtue of my present invention this necessity is avoided because by manipulation of the pedal 28 I am able to disengage latch 14 from notch 13 and consequently the steering of the tractor may then be effected by the manipulation of shaft 11 through the conventional hand wheel 6, the disk exercising no control over the steering.

Among the important advantages inherent in this proposed arrangement are the following:

1. As stated it is not necessary to lift the disk in order to release the tractor from the control of the steering mechanism.

2. The position of the disk, disposed as it is toward the rear of the machine, does not interfere with the short turning radius attainable with this type tractor.

3. The disk is pulled instead of being pushed so that there is no possibility of its digging itself into the ground to an undesirable extent, or being broken off by contact with stumps or other obstructions. Further, this arrangement lessens the back pressure on the frame work of the attachment and the tractor.

4. The attachment is of a simple and inexpensive nature which may be applied in a very short time and it projects in front of the tractor only a very short distance so that the tractor requires less parking space than is usual with tractors equipped with other devices of this nature.

It is to be understood that the invention is not limited to the precise construction set forth but that it includes within its purview whatever changes fairly come within either the terms or the spirit of the appended claims.

Having described my invention, what I claim is:

1. The combination with a tractor and an element of the steering mechanism thereof, of a trailing disk attached to the tractor and adapted to travel in a furrow, a tie rod movable under the influence of said disk, means to which the tie rod is connected, said means having engagement with the member of the steering mechanism of the tractor, and means for releasing the connection of said first named means with said member of the steering mechanism independently of the movement of said disk out of said furrow.

2. The combination with a tractor, a cross bar carried thereby, a trailing disk connected to a projecting end of said cross bar, a member of the steering mechanism of the tractor, a tie rod movable laterally under the influence of the movement of said disk, a plate to which the inner end of said tie rod is connected, a latch bar for engagement with the plate, a lever pivoted intermediate its ends to which said latch bar is connected, a second rod connected to the other end of said lever, and means upon the frame of the tractor for imparting rearward drawing movement to the last named rod.

3. The combination with a tractor and its frame, of a pair of forwardly projecting brackets, a cross bar carried by said brackets and projecting laterally beyond one side of the tractor at the front thereof, a swingingly mounted rearwardly projecting guide rod, a trailing disk upon the rear end of said guide rod, a tie rod connected to the guide rod, a shaft constituting part of the steering mechanism of the tractor, a horizontally swinging segment having a notch formed in its forward end, engaged with said shaft, a latch adapted to engage in said notch, a pivoted lever, a link connecting said pivoted lever and said latch, a rearwardly extending rod connected to the other end of said lever, and a pedal upon the tractor frame to which the rear end of the last named rod is connected.

In testimony whereof he affixes his signature.

HENRY KOENIG.